Figure 1:
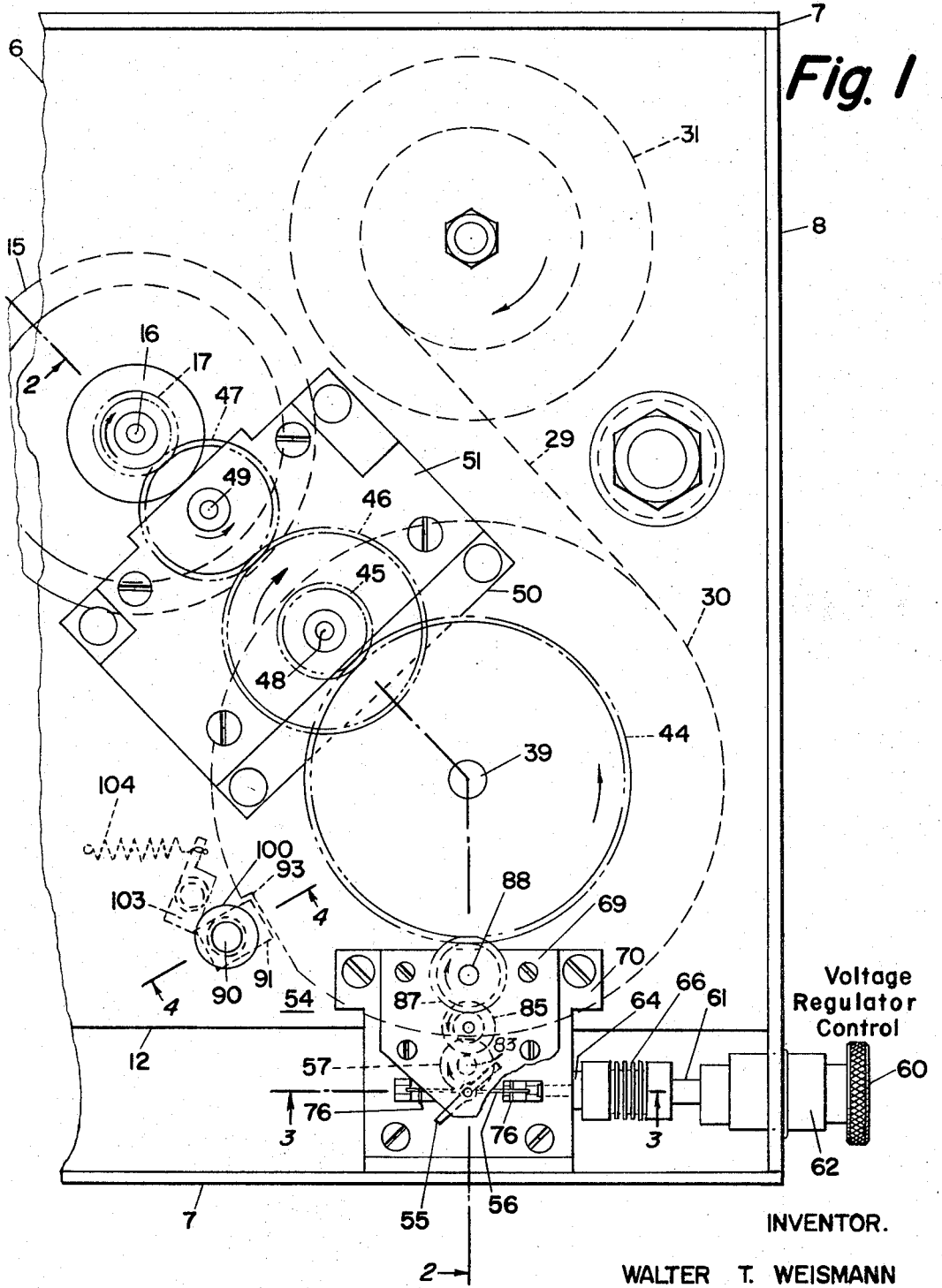

Nov. 21, 1967  W. T. WEISMANN  3,354,383
SPRING POWERED AND REGULATED GENERATOR
Filed Aug. 27, 1964  3 Sheets-Sheet 1

INVENTOR.
WALTER T. WEISMANN
BY Harry M. Saragovitz,
Edward J. Kelly, Herbert Berl,
& S. Dubroff
ATTORNEYS Nov. 21, 1967  W. T. WEISMANN  3,354,383
SPRING POWERED AND REGULATED GENERATOR
Filed Aug. 27, 1964  3 Sheets-Sheet 3
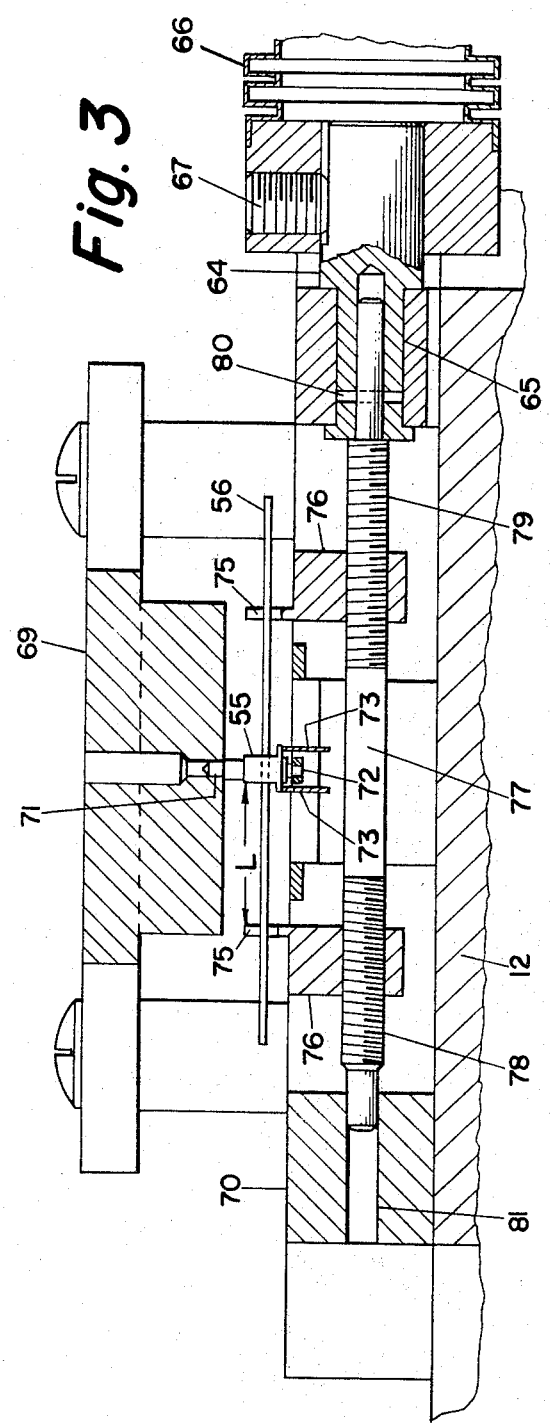
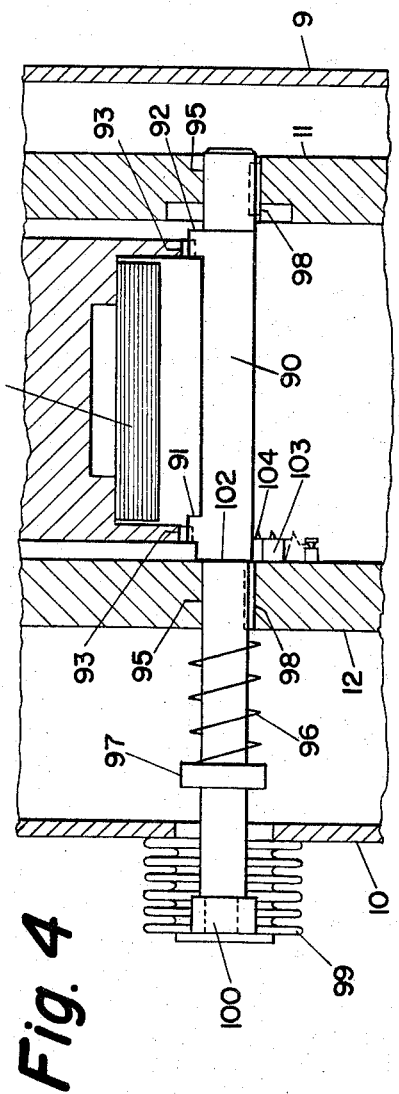
INVENTOR
WALTER T. WEISMANN
ATTORNEYS

United States Patent Office 3,354,383
Patented Nov. 21, 1967

3,354,383
SPRING POWERED AND REGULATED GENERATOR
Walter T. Weismann, Hackettstown, N.J., assignor to the United States of America as represented by the Secretary of the Army
Filed Aug. 27, 1964, Ser. No. 392,666
10 Claims. (Cl. 322—29)

The invention described herein may be manufactured and used by or for the Government for governmental purposes without the payment to me of any royalty thereon.

This invention relates to low-power electric generators of the manually-operated or hand-cranked type adapted for use in remote areas for demolitions and other ignition spark supply, radio and communications operation, limited illumination, and the like. More particularly, it relates to low-power electric generators of the spring-powered or wind-up type which are thus self-energized and can release kinetic energy and generates electrical energy for instant use, without standby battery power of any kind.

It is a primary object of this invention to provide an improved and efficient self-energized kinetic electric generator of that type, whereby reliable electric power can be made available with substantially unlimited storage life.

Present day military weapons and equipment, as well as commercial developments, demand selected components with high reliability for their applications. Battery power, however improved, often fails to fulfill this requirement because of the inherent relatively short shelf or storage life thereof, and electronic devices dependent thereon thus may have limited use. A self-energized electric generator of the type referred to solves the energy storage problem. To have such a generator fully effective for missiles and other military applications, it is necessary to incorporate certain requirements and improvements in the construction.

In the prior art construction of spring-powered or wind-up type electric generators, a long, deflection, constant-torque type of spring, coiled flat under tension on one drive reel or drum and unwinding therefrom onto a second or storage reel or drum, is used to drive the load device or generator. Inertial type braking is provided in the drive by a five-stage or like multi-stage step-up gearing which steps up the real speed to the operating speed of the particular generator used. This involves a large number of gear elements in a generally bulky and relatively costly construction in addition to the spring unit. The spring merely unwinds against the inertial load of the gearing at one fixed speed, which inherently must fall slightly as the unwinding progresses to completion.

It is, therefore, a further object of this invention to provide an improved spring-powered or wind-up electric generator wherein the generator speed is maintained substantially constant at any setting and is adjustable to different settings, thereby to adjust the output voltage level.

It is also an object of this invention to provide an improved kinetic spring-powered and regulated electric generator of the type referred to which is of simplified construction, less bulky and costly than multi-stage gearing in the speed control means and involving fewer, much lighter and smaller components, whereby it is better adapted for miniaturization, module-type component units, and hermetical sealing.

In accordance with one form of the invention, an escapement mechanism is connected to be driven by and thus control the unwind action of the driving spring and reel, and the speed of the generator. The escapement mechanism, in accordance with the invention, is adjustable in beat-rate of frequency to adjust the generator speed and its output voltage level, thus better adapting the generator unit for use with missiles and other military equipment.

Preferably a cylinder type escapement mechanism, with oscillating pallet elements and hair spring control means therefor, is used to regulate the drive reel speed, and hence the output voltage level of the generator. Thus, by adjusting the hair spring effective length, the frequency or beat-rate of the pallet or escapement and the drive-reel and generator speeds, can be increased and decreased to adjust the output voltage level. The frequency or beat-rate of the escapement mechanism is thus proportional to the output voltage level.

By using the escapement mechanism as a speed and voltage output control means, the number of parts or components may be reduced greatly from that required for a five-stage or like inertial gear train, and much lighter and smaller components may be used. With this type of generator, electrical energy can be made available with practically unlimited storage life.

The invention will, however, be further understood from the following description of a preferred embodiment thereof, when considered with reference to the accompanying drawings, and its scope is pointed out in the appended claims.

Figure 2:
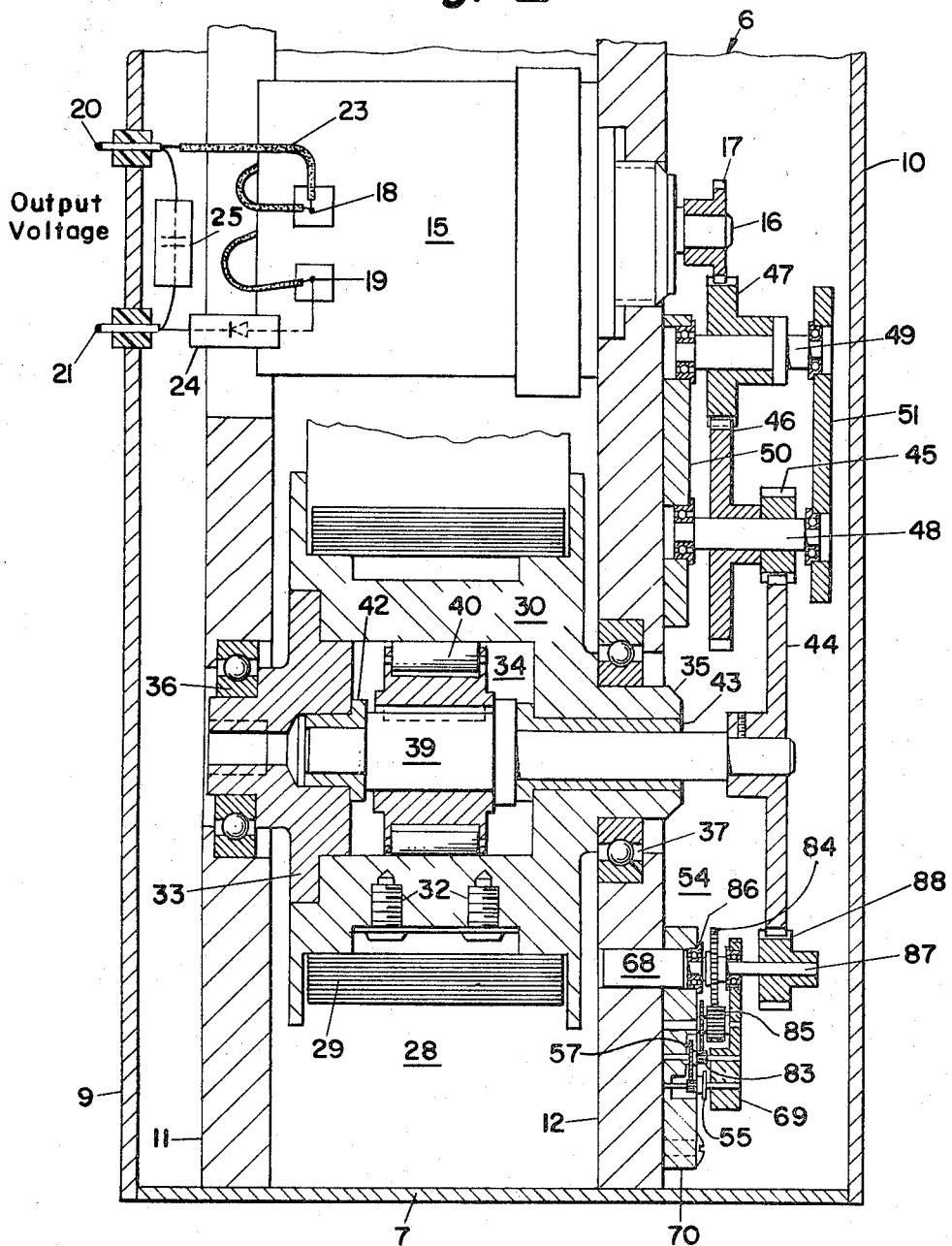

In the drawings,

FIG. 1 is a plan view, with cover removed and on an enlarged scale, of a spring-powered and regulated electric generator unit embodying the invention, FIG. 2 is a sectional view of the generator unit of FIG. 1, taken on the section line 2—2, showing further details thereof in accordance with the invention, and FIGS. 3 and 4 are further sectional views of portions of the generator unit of FIG. 1, taken respectively on section lines 3—3 and 4—4 thereof and on a further enlarged scale, showing further details of construction in accordance with the invention.

Referring to the drawings, wherein like elements throughout the various figures are designated by like reference numerals, and referring particularly to FIGS. 1 and 2, the generator or generator unit is provided with a casing or housing 6 adapted to be tightly and hermetically sealed. The housing has end plates 7, side plates 8, of which one is shown, and top and bottom plates 9 and 10 respectively, with the top plate removed in FIG. 1 to show the interior mechanism more fully. This mechanism is mounted on and supported by two relatively heavy and rigid top and bottom mounting plates 11 and 12, respectively, extending in spaced parallel relation to each other within the housing as indicated more clearly in FIG. 2.

A hermetically-sealed modulator-type electric generator unit is provided. The electric generator 15 is mounted directly in connection with the top mounting plate 12, and between the plates as shown in FIG. 2 also. This is provided with a drive shaft 16, on which is mounted a driving pinion 17, and with output terminals 18 and 19. These are connected to supply output voltage (output electrical energy) to sealed-in output terminals 20 and 21, respectively, for the generator unit. The connection between the terminals 18 and 20 is made direct through an insulated conductor or lead 23, and the connection between the terminals 19 and 21 is made through a series diode rectifier 24, all as indicated in FIG. 2. An output storage or filter capacitor 25 is connected between the output terminals 20 and 21 to complete a series-diode shunt-capacitor output voltage control circuit in connection with the generator. This may thus be either of the D-C or the alternator type while providing a desired D-C output voltage at the terminals 20–21, as an ignition spark source, for example.

The power required to drive the generator is supplied from a constant-torque type of wind-up or spring motor 28 mounted on and between the two mounting plates 11 and 12 as shown in the drawing figures referred, particularly FIG. 2. This comprises a long constant-torque drive spring 29 coiled flat on a flanged drive reel or drum 30 under tension and unwinding therefrom onto a second or smaller storage reel or drum 31 to drive the generator. The inner end is tapered and anchored to the reel by suitable means, such as two screws 32.

The drive reel 30 is hollow and provided with a removable end cap 33 which is fitted into one end as a closure means for a central axially-extending chamber 34, and as an end hub. The latter is complementary to an axially-opposite end hub 35, for mounting in ball-bearings 36 and 37, respectively, in the plates 11 and 12. The drive reel is thus free to turn in either direction in the bearings 36 and 37, to wind up the spring 29 in one direction or to unwind the spring in the opposite driving direction. In the former direction it is free, while in the latter direction is is connected with and turns a main drive shaft 39 through a one-way clutch 40 which may be of any suitable and well known construction.

The drive shaft is mounted in coaxial relation to the reel of drum 30 and, when declutched, is free to turn, or to permit the reel to turn about it as a fixed axis, in sleeve bearings 42 and 43 provided in the reel end hub element 33 and 35 respectively. The upper end of the drive shaft extends beyond or outside of the bearing 43 for receiving a large drive gear 44 which is affixed thereto. With the pinion 17, the drive gear is part of a relatively-small two-stage step-up gearing or gear train comprising a two-step pinion and gear element 45–46 and an idler gear 47 in meshing or driving relation, as indicated.

The element 45–46 and the idler element 47 are mounted on short guide shafts 48 and 49, respectively, having ball-bearing or like free-turning mountings in spaced fixed support brackets 50 and 51. It is understood that the pinion 45 and the gear 46 are rigidly connected together on the shaft 48 as a single gear and pinion element. The speed step up is from the gear 44 to the pinion 45 and from the gear 46 to the pinion 17 on the generator shaft through the idler gear 47 which does not change the speed ratio but provides the proper direction of rotation for the generator.

As compared with the five-stage step-up gear train normally required to operate an electric generator in spring-powered or wind-up type generators heretofore provided, the two-stage step-up provides the desired or required generator speed with a reel speed adapted for an unwinding operation over a desired time interval of operation, such as an hour for example. Thus it has a minimum number of gear elements and may be of the simplified construction shown. With relatively small parts and bearings providing low frictional loading, it has relatively low braking and inertial load control of the speed. In some forms of spring-powered generators, the inertial loading of the gearing or gear train provides speed control to a desired degree. Thus no output voltage regulation can be provided except through electrical circuits and controls which can be complicated and add to the cost of construction.

A simplified adjustable output voltage regulator means is desirable, therefor, and is provided in the present speed control means which includes an escapement mechanism 54, with an oscillatory pallet element 55 and a control or hair spring 56, the operation or effective length, L, of which can be adjusted. By thus adjusting the effective length of the hair spring or control spring on the pallet, the best rate or oscillatory frequency of the pallet, and the speed of movement of a controlled escapement wheel 57 in the present example is adjusted and is proportional to the voltage output, since it controls the generator speed, in accordance with the invention.

The adjustable voltage regulator means is provided with a control knob 60 located externally of the sealed unit as indicated in FIG. 1 and connected internally to control the escapement frequency or beat by rotation in either direction. Certain of the details of this feature of the control are shown more fully in FIG. 3 to which attention is now directed, along with FIGS. 1 and 2.

The external control element or knob 60 is connected with a short internal shaft 61 which passes through and is mounted to rotate in hermetic rotary-seal bearing unit 62 in the side plate 8 of the sealed housing. A second short rotary motion transmitting shaft 64 is mounted in a fixed bearing 65 in axial alignment with the shaft 61 and connected for rotation thereby through a flexible shaft-coupling bellows unit 66. This unit is provided to operate freely in accepting any slight misalignment between the two shafts. A set screw 67 serves to lock the coupling unit 66 with a groove in the shaft 64, as indicated in FIG. 3.

The escapement mechanism 54, which the above shaft connection controls, is provided as a unit which mounts on the upper mounting plate 12 and is aligned on a mounting dowel pin 68 as indicated in FIG. 2. The mechanism, including the pallet 55, escapement wheel 57 and control or hair spring 56, is contained between two mounting plates 69 and 70, of which the bottom plate 70 is used to house or support various components. It provides the necessary adjustment, plus mounting the unit to the basic system, reference being made to FIG. 3 for certain of the details, and provides the bearing 65 for the shaft 64.

The pallet 55 is pivoted to rotate in bearing means to 71 and 72 in the upper and lower plates and carries the usual pallet plates 73 which oscillate to step the toothed escapement wheel 57 in the well known manner as the wheel is driven by the controlled spring motor means through connection with the drive gear 44.

The flat escapement spring 56 is anchored in the pallet 55 and extends therefrom with two flexible arms each through a slot 75 in a movable adjusting block or nut 76. The latter are carried by and move on a rotary control or adjusting screw 77 having left and right-hand thread sections 78 and 79, respectively, in the areas of the blocks, all as indicated more fully in FIG. 3. The control or adjusting screw 77 is mounted at one end in connection with the shaft 64 in axial extension thereof, being inserted therein and pinned as indicated at 80. At its opposite end it is mounted to rotate in a bearing opening 81 in the lower plate 70 corresponding to the opening 65 for the shaft 64.

It will be seen that as the control or adjusting screw 77 is rotated by the control knob or external voltage regulator control element 60, in either direction, the distance between the adjusting blocks 76 will be increased or decreased, depending upon the setting or direction. Thus the effective or operating length, L, of each arm of the escapement or pallet spring 56 will be changed likewise to change the frequency or beat rate of the escapement pallet 55 in connection with the escapement wheel 57. The latter is provided with the usual pinion element 83 which is coupled to be driven from a gear element 84 through an intermediate step-up gear-and-pinion element 85 in an effective two-stage gearing or gear train.

The gear element 84 is mounted on a stub shaft 87 with which it rotates in suitable free-running bearings in the mounting plates 69 and 70. The upper end of the shaft 87 is extended to carry a driving pinion 88 which meshes with the main drive gear 44. Thus the escapement unit is driven from the spring motor means through a simple meshing connection with the main drive gear 44.

As has been pointed out, the operation of the generator unit is at a constant speed under control of an escapement mechanism which is adjustable in frequency or beat rate to adjust the output voltage to a desired level. The constant-torque spring 29 is the originating power source and is wound onto the output drum 30, and, when released, unwinds outwardly to drive the drum and the generator. It returns to and is stored on the drum 31.

The inertial load on the spring is reduced as much as possible by the use of ball-bearing and like low-friction bearing means, and by the use of a gear train of a minimum number of pinion and gear elements or stages. The variable-speed escapement thus provides substantially full speed control and voltage regulator control. The simplified hair spring control for the pallet is adapted for use in a sealed housing with external rotary operating means.

When the spring is wound and the unit is ready for operation, the output drum is locked against rotation until the unit is put into operation to produce output electrical energy. The locking means is shown in FIG. 1 and in FIG. 4 to which attention is now directed for this feature.

A rod or plunger type output drum or reel block element 90 extends between the flanges of the output drum or reel 30 where radial lugs 91 and 92 thereon engage corresponding notches 93 in the flanges and one of which is indicated in FIG. 1. The lock element is held in operative position, and guided for longitudinal movement from the locked position shown in FIG. 4, downwardly or to the right as viewed in said figure, in aligned bearing openings 95 in the upper and lower or top and bottom mounting plates 12 and 11. The lock is held in position by a compression spring 96 which seats on the plate 12 and acts against a collar 97 on the plunger lock element 90.

The lock element is keyed against rotation, as indicated at 98 in the bearing openings, and extends outwardly through the casing top plate 10 into a position to be manually depressed to unlock the output drum or reel and start the generator. For this purpose it is sealed within an operating bellows 99 and provided with a button head or collar 100 within the outer end of the bellows.

The lock element 90 is also provided with a shoulder 102 which meets the mounting plate 12 at the bearing opening 95. A pivoted latch 103 actuated by a suitable tension spring 104, swings into engagement with this shoulder, to lock the element 90 out of operation to stop and hold the output reel or drum, after the start button element 100 has been depressed sufficiently to unlock the said reel or drum. The wound drive spring 29 then unwinds off the drive reel 30 into the storage reel 31 at a rate of speed determined by the operating speed or frequency of the escapement mechanism 54. The drive reel 30 is in driving connection with the shaft 39 through the one-way clutch means 40 within the reel and the gear train connection to the generator 15 is of low inertia and with low friction loading. Thus the generator speed is substantially wholly controlled by the escapement mechanism and the effective length of the hair spring control element 56 thereof.

The external control knob 60, which is connected to adjust the effective length of the hair-spring element, becomes the voltage regulator control means for the generator unit. By thus adjusting the hair spring element on the pallet, the gear train speed can be permitted to increase or decrease depending upon the direction of rotation of the element 60. Then the frequency or beat rate of the escapement mechanism is proportional to the voltage output, and can thus be adjusted to attain the desired voltage level.

Furthermore, by so connecting and utilizing an escapement mechanism as a speed and voltage output control means, a reduction in the number and complexity of components used is attained as compared with the inertial type gear train loading commonly used in spring-powered generators, which also lack the output voltage regulation.

I claim:

1. A spring-powered electric generator unit comprising in combination, an electric generator having a rotary operating shaft, a long-deflection constant-torque driving spring and rotary wind-up reel therefor, a second reel onto which said spring unwinds to drive said first-named reel, means providing a low-inertia driving connection between said first-named reel and the generator shaft, an escapement mechanism connected to control and hold the unwind speed of said first-named reel and the generator speed at a constant level, said mechanism having an oscillatory pallet element and hair spring control element for establishing the escapement frequency and generator speed, and means for varying the effective operating length of the hair-spring element and the generator speed to regulate the output voltage of said unit.

2. A spring-powered electric generator unit as defined in claim 1, wherein the generator is further provided with a series-diode shunt-capacitor output voltage control circuit.

3. A spring-powered electric generator unit as defined in claim 1, wherein the low-inertia driving connection between the driving reel and generator shaft includes a two-stage step-up gear train with low-friction bearing elements.

4. A spring-powered electric generator unit comprising in combination an electric generator having a rotary drive shaft, rotary spring motor means in driving connection with said shaft, said motor means being of the constant-torque type providing relatively high-level kinetic energy storage for driving said generator, releasable means for locking said motor means against operation, an escapement mechanism for controlling the release of stored kinetic energy to operate the generator at a speed for a desired output voltage level, said mechanism including an escapement wheel connected to be driven by said motor means and a hair-spring-controlled oscillatory pallet element therefor, and means providing hairspring adjustment of said mechanism to set the beat-rate thereof and the generator speed and output voltage level.

5. A spring-powered electric generator unit as defined in claim 4, wherein the releasable means for locking the motor means against rotation includes a drive reel having an end flange with a locking element thereon, a movable plunger-type reel lock engaging said locking element and locking said reel, spring means resiliently holding said reel lock in the locking position, manual means connected with said reel lock to move it against the holding action of said spring means from the locking position, thereby to start the motor means, and releasable latch means for holding said reel lock from returning to said locking position.

6. A spring-powered electric generator unit as defined in claim 4, wherein the driving connection between the motor means and the generator drive shaft includes a step-up gear train of a relatively low number of stages providing low inertial and frictional loading for said motor means, and wherein the pallet element is provided with an elongated flexible hair spring connected with and extending therefrom for variation in effective length by and in connection with said hair spring adjustment means.

7. A spring-powered electric generator unit as defined in claim 6, wherein the hair-spring adjustment means includes a rotary control screw having an external voltage regulator control knob connected therewith, and a threaded nut element movable on said screw and engaging said hair-spring element to establish and vary the effective length of the extension thereof from the pallet element.

8. A spring-powered electric generator unit comprising in combination, a constant-torque spring motor, an electric generator connected to be driven thereby as a rotary load with relatively low inertial coupling, and means connected with said motor for adjusting the generator speed and voltage output to different levels and maintaining the adjusted level substantially constant, said last named means including an escapement mechanism having an oscillatory pallet with a hair-spring control element of variable effective length to set the speed of operation and voltage output of the generator.

9. A spring-powered electric generator unit as defined in claim 8, wherein the hair-spring control element comprises a flat escapement spring anchored to the pallet and extending therefrom with two flexible arms into engagement with a pair of movable threaded adjusting blocks, and wherein the said blocks are carried by and move on a rotary adjusting screw having right and left-hand thread sections in the areas of the blocks under control of an external manually-operable voltage regulator element.

10. An electric generator unit adapted to be hermetically sealed and comprising in combination, an enclosing casing, a rotary spring motor of the constant-torque type, an electric generator load for said motor with relatively low inertial coupling therebetween, an escapement mechanism having an oscillatory pallet with a hair-spring frequency-control element of variable effective length, an escapement wheel connected to be driven with said load by the spring motor and controlled in rotation by the pallet operation whereby the load speed is controlled, and means for varying the effective length of the hair-spring element to adjust the beat-frequency of the pallet and thereby the speed of the generator load and the output voltage of the unit.

References Cited

UNITED STATES PATENTS 2,277,897   3/1942   Alexander _____ 185—38 X

JOHN F. COUCH, *Primary Examiner.*

H. HUBERFELD, *Assistant Examiner.*